(12) United States Patent
Koyanagi

(10) Patent No.: US 10,486,381 B2
(45) Date of Patent: Nov. 26, 2019

(54) TIRE MOLD AND METHOD FOR MANUFACTURING TIRE MOLD

(71) Applicant: BRIDGESTONE CORPORATION, Tokyo (JP)

(72) Inventor: Tomo Koyanagi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 59 days.

(21) Appl. No.: 15/578,078

(22) PCT Filed: Jun. 7, 2016

(86) PCT No.: PCT/JP2016/066949
§ 371 (c)(1),
(2) Date: Nov. 29, 2017

(87) PCT Pub. No.: WO2016/199772
PCT Pub. Date: Dec. 15, 2016

(65) Prior Publication Data
US 2018/0186110 A1   Jul. 5, 2018

(30) Foreign Application Priority Data

Jun. 9, 2015 (JP) .................... 2015-116890

(51) Int. Cl.
*B29D 30/06* (2006.01)
*B29C 33/04* (2006.01)
(Continued)

(52) U.S. Cl.
CPC ....... *B29D 30/0606* (2013.01); *B22D 23/003* (2013.01); *B22F 3/115* (2013.01);
(Continued)

(58) Field of Classification Search
CPC ............ B29D 30/0629; B29D 30/0662; B29D 2030/0666; B29D 2030/0667; B29D 2030/0671; B29C 33/04
See application file for complete search history.

(56) References Cited

U.S. PATENT DOCUMENTS

| 1,630,113 | A | * | 5/1927 | De Mattia | .......... | B29D 30/0606 |
| | | | | | | 425/40 |
| 2,046,372 | A | * | 7/1936 | Engstrom | .......... | B29D 30/0606 |
| | | | | | | 165/47 |

(Continued)

FOREIGN PATENT DOCUMENTS

| DE | 102013222662 A1 | 5/2015 |
| JP | 52-117383 | * 10/1977 |

(Continued)

OTHER PUBLICATIONS

Jul. 5, 2016 International Search Report issued in International Patent Application No. PCT/JP2016/066949.

(Continued)

*Primary Examiner* — James P Mackey
(74) *Attorney, Agent, or Firm* — Oliff PLC

(57) ABSTRACT

Tire mold subject to least energy loss from heat dissipation during a curing process and thus capable of improving a curing efficiency, the tire mold has hollow cavities therein and a heating medium that circulates inside the hollow cavities, thereby heating a tire through the mold.

14 Claims, 10 Drawing Sheets

(51) Int. Cl.
    *B33Y 10/00*     (2015.01)
    *B33Y 80/00*     (2015.01)
    *C23C 4/123*     (2016.01)
    *B22D 23/00*     (2006.01)
    *B22F 3/115*     (2006.01)
    *B29C 33/38*     (2006.01)

(52) U.S. Cl.
    CPC .......... *B29C 33/04* (2013.01); *B29C 33/3842* (2013.01); *B29D 30/0662* (2013.01); *B33Y 10/00* (2014.12); *B33Y 80/00* (2014.12); *C23C 4/123* (2016.01); *B29D 2030/0671* (2013.01)

(56) References Cited

U.S. PATENT DOCUMENTS

| | | | |
|---|---|---|---|
| 3,556,201 A * | 1/1971 | Sander | B29C 35/007 |
| | | | 165/253 |
| 3,833,323 A * | 9/1974 | Pasch | B29D 30/0629 |
| | | | 425/46 |
| 3,999,907 A * | 12/1976 | Pappas | B29D 30/0629 |
| | | | 425/20 |
| 4,515,541 A * | 5/1985 | Salvadori | B29D 30/0629 |
| | | | 425/40 |
| 6,413,068 B1 * | 7/2002 | Steidl | B29D 30/0629 |
| | | | 425/40 |
| 7,160,090 B2 * | 1/2007 | Yang | B29C 33/046 |
| | | | 249/79 |
| 9,815,249 B2 * | 11/2017 | Sasaki | B29D 30/0629 |
| 2006/0257511 A1 | 11/2006 | Iwamoto et al. | |
| 2011/0180958 A1 * | 7/2011 | Goumault | B29C 33/04 |
| | | | 264/236 |
| 2011/0259487 A1 | 10/2011 | Montbel et al. | |
| 2011/0304082 A1 | 12/2011 | Dusseaux et al. | |
| 2011/0309230 A1 | 12/2011 | Lauwers et al. | |
| 2011/0309556 A1 | 12/2011 | Lauwers | |
| 2011/0318532 A1 | 12/2011 | Dusseaux et al. | |
| 2012/0114777 A1 | 5/2012 | Villeneuve et al. | |
| 2012/0260492 A1 | 10/2012 | Bonnet et al. | |

FOREIGN PATENT DOCUMENTS

| | | |
|---|---|---|
| JP | H07-251421 A | 10/1995 |
| JP | H10-180765 A | 7/1998 |
| JP | H11-165320 A | 6/1999 |
| JP | 4382673 B2 | 12/2009 |
| JP | 2012-512069 A | 5/2012 |
| JP | 2012-512070 A | 5/2012 |
| JP | 2012-512071 A | 5/2012 |
| JP | 2012-513911 A | 6/2012 |
| JP | 2012-513917 A | 6/2012 |
| JP | 2012-530005 A | 11/2012 |
| JP | 2013-510235 A | 3/2013 |
| WO | 2004/048062 A1 | 6/2004 |
| WO | WO 2011/077844 * | 6/2011 |
| WO | 2014/129651 A1 | 8/2014 |

OTHER PUBLICATIONS

May 25, 2018 European Search Report issed in European Patent Application No. 16807479.7.

Dec. 12, 2017 International Preliminary Report on Patentability issued in International Patent Application No. PCT/JP2016/066949.

* cited by examiner

TIRE MOLD AND METHOD FOR MANUFACTURING TIRE MOLD

BACKGROUND OF THE INVENTION

1. Field of the Invention

The present invention relates to a tire mold and, more particularly, to a tire mold capable of improving curing efficiency and a method for manufacturing the tire mold.

2. Description of the Related Art

Conventionally, a tire curing apparatus for curing (vulcanizing) an uncured tire (green tire) has side molds surrounding respective side regions of the uncured tire, a plurality of crown molds surrounding a crown region of the uncured tire, upper and lower platens disposed on the periphery of the side molds and having flow channels formed therewithin for circulating a heating medium, such as steam, and jackets disposed on the periphery of the crown molds and having flow channels formed therewithin for circulating the heating medium. And the heat supplied from the upper and lower platens and the jackets is transferred through the side molds and the crown molds to accelerate the curing of the uncured tire.

The heat from the upper and lower platens and the jackets is transferred to the uncured tire by way of the side molds or the crown molds. However, because of the separation between the heating medium circulating through the flow channels and the uncured tire, part of the heat being transferred dissipates from the side molds or the crown molds. And this causes a problem of low curing efficiency.

RELATED ART DOCUMENT

Patent Document

Patent Document 1: Japanese Patent No. 4382673

SUMMARY OF THE INVENTION

Problem to be Solved by the Invention

The present invention has been made in view of the foregoing problem, and an object of the invention is to provide a tire mold subject to minimum energy loss due to heat dissipation during the curing process and thus capable of improving the curing efficiency.

Means for Solving the Problem

A tire mold to solve the above-mentioned problem is so configured as to be a tire mold for curing a tire by transferring heat to the tire, which includes a hollow cavity formed inside the tire mold and a heating medium held inside the hollow cavity and heating the tire via the tire mold.

According to this configuration, a hollow cavity in which a heating medium is held is provided inside a tire mold, and the heating medium in the hollow cavity heats an uncured tire. This makes a distance between the heating medium and the tire close. As a result, there occurs reduced energy loss associated with curing, thereby improving a curing efficiency. Also, the heating medium used is an optional material different from a material of the tire mold. Also, a plurality of hollow cavities may be provided independently of each other. Here, the state of a plurality of hollow cavities provided independently of each other means a state in which the plurality of cavities are not communicated with each other.

Also, an implementation of a method for manufacturing a tire mold to solve the above-mentioned problem relates to a method for manufacturing a tire mold for curing a tire by transferring heat to the tire. The method includes a step for forming a hollow cavity inside the tire mold and a step for forming heating medium supply/discharge channels communicating with the hollow cavity and outside of the tire mold.

It is to be understood that the foregoing summary of the invention does not necessarily recite all of the features essential to the invention, and subcombinations of all these features are intended to be included in the invention.

BEST MODE FOR CARRYING OUT THE INVENTION

Hereinafter, the invention will be described based on preferred embodiments which do not intend to limit the scope of the claims of the present invention. Not all of the combinations of the features described in the embodiments are necessarily essential to the problem-solving means of the invention.

First Embodiment

Figure 1:
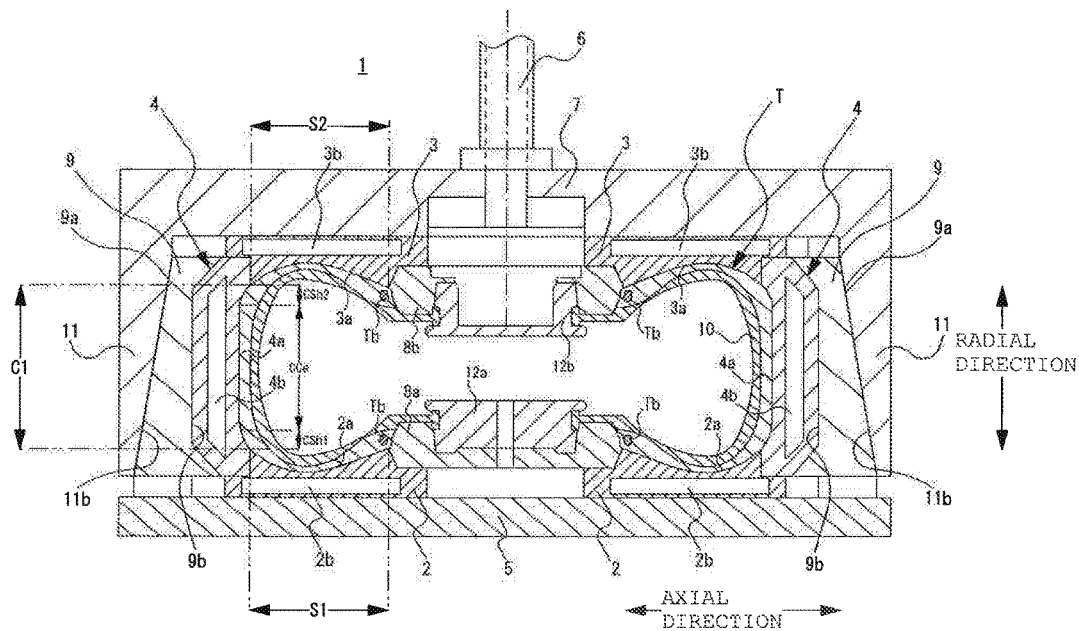
FIG. 1 is a schematic cross section showing a curing apparatus.

FIG. 1 is a schematic cross section of a curing apparatus 1.

As shown in FIG. 1, the curing apparatus 1 includes a side mold 2, which molds and cures a side region S1 of one side (lower side) of an uncured tire T (hereinafter referred to simply as "tire") placed horizontally on its side with the central axis of rotation extending vertically and a side mold 3, which molds and cures a side region S2 of the other side (upper side) of the tire T, placed opposite to the side mold 2. The curing apparatus 1 further includes a plurality of sector molds 4 for molding and curing a crown region C1, which are arranged annularly along the crown region C1 which becomes a contact patch of the tire T, between the side molds 2 and 3. It is to be noted that the axial, circumferential, and radial directions mentioned in this specification are the directions viewed with reference to the tire molds (side molds 2 and 3 and sector molds 4) set in the curing apparatus 1 as shown in FIG. 1.

The tire T is, for instance, an uncured tire (green tire) having been molded on a not-shown tire molding drum. The tire T, as it is placed in the curing apparatus 1, is constituted by such not-shown component members as a carcass extending toroidally astride a pair of bead regions Tb, Tb disposed vertically apart from each other, a plurality of belts stacked on the carcass and a tread rubber in the crown region C1, and side rubbers disposed on the carcass in the side regions S1, S2.

The side mold 2, placed on a base 5, is a disk-shaped mold with an open central section. The side mold 2 molds the surface of the side region S1 with a molding surface 2a in contact with the surface of the side region S1 extending from the vicinity of one of the bead regions Tb, Tb toward the crown region C1 with the tire T placed on its side. It is to be noted that, though the detail will be discussed later, the side molds 2, 3 and the sector molds 4 each consist of a base mold 20, which serves as a base member, and a pattern mold 30, which is a pattern molding member to be fitted detachably to the base mold 20.

Formed inside of the side mold 2 is a heating chamber 2b rectangular in cross section extending radially, which covers approximately the whole area of the side region S1. The heating chamber 2b is an annular flow channel formed within the side mold 2 in such a manner as to be opposite to the upper surface of the base 5. As will be described in detail later, a heating medium is supplied into the heating chamber 2b from a not-shown heat source supply unit. The heat produced by the heating medium is transferred to the side region S1 of the tire T via the side mold 2. The open section of the side mold 2 is closed by a bead ring 8a, which molds the periphery of one of the bead regions Tb, Tb, and a clamp ring 12a, which holds a bladder 10 to be discussed later.

The side mold 3, as with the side mold 2, is a disk-shaped mold having an open central section. The side mold 3 molds the surface of the side region S2 with a molding surface 3a in contact with the side region S2 extending from the vicinity of the other of the bead regions Tb, Tb toward the crown region C1 with the tire T placed on its side. The side mold 3 is placed below the lower face of an outer ring 7 which rises and lowers along with the up-and-down movement of a center post 6.

Formed inside of the side mold 3 is a heating chamber 3b rectangular in cross section extending radially in a position opposing to the heating chamber 2b, which covers approximately the whole area of the side region S2. The heating chamber 3b is an annular flow channel formed inside the side mole 3 in such a manner as to be opposite to the lower face of the outer ring 7. A heating medium is supplied into the heating chamber 3b from a not-shown heat source supply unit. The heat produced by the heating medium is transferred to the side region S2 of the tire T via the side mold 3. Also, the open section of the side mold 3 is closed by a bead ring 8b, which molds the periphery of the other of the bead regions Tb, Tb, and a clamp ring 12b, which holds the bladder 10 to be discussed later.

The plurality of sector molds 4 enclose the crown region C1 of the tire T annularly as they are combined with each other circumferentially. The sector molds 4 are, for instance, divided into eight divisions along the circumference of the tire T. A pattern molding surface 4a that comes in contact with the surface of the crown region C1 has raised and recessed portions for molding a predetermined tread pattern on the surface of the crown region C1. As the pattern molding surface 4a comes in contact with the surface of the crown region C1, a tread pattern having inverted recesses and projections formed on the pattern molding surface 4a is molded on the crown region C1.

Formed inside each of the sector molds 4 is a heating chamber 4b approximately trapezoidal in cross section extending in the axial direction. The heating chamber 4b is an annular flow channel formed inside each of the sector molds 4 in such a manner as to be opposite to an inner periphery 9b of the segment 9 to be discussed later. A heating medium is supplied into the heating chamber 4a, in the same way as the other heating chambers 2b, 3b, from a not-shown heat source supply unit. The heat produced by the heating medium is transferred to the crown region C1 of the tire T via the sector molds 4.

The plurality of sector molds 4 are held by a plurality of segments 9 which are movable radially wider or narrower along a slider mechanism disposed on the base 5. An outer periphery 9a of the segments 9 is formed as an inclined surface of the same gradient as that of an inner periphery 11b of an arm portion 11 of the outer ring 7. At the start of a curing process, the center post 6 is lowered to have the inner periphery 11b of the arm portion 11 slide along the outer periphery 9a of the segment 9, thus radially moving the plurality of segments 9 narrower. And as the center post 6 reaches the lowering limit position, the plurality of sector molds 4 enclose the crown region C1 of the tire T without gaps therebetween. Then a heating medium to be discussed later is supplied into the heating chamber 2b in the side mold 2, the heating chamber 3b in the side mold 3, and the heating chamber 4b in the sector mold 4. And the crown region C1 of the tire T is heated by the heat of the heating medium circulating within the heating chambers 2b, 3b, and 4b. When stripping the tire T from the mold on completion of the curing process, the center post 6 is raised to free the hold on the segments 9 by the arm portion 11 of the outer ring 7 and cause the segments 9 to spread radially.

The bladder 10 is placed on the inner periphery side of the tire T enclosed by the side molds 2, 3 and the plurality of sector molds 4. The bladder 10 is of an elastic material inflatable by a fluid supplied from the outside of the curing apparatus 1. As the bladder 10 is inflated, the outer periphery of the bladder 10 comes into tight contact with the inner periphery of the tire T and pushes the outer periphery of the tire T against the side molds 2, 3 and the plurality of sector molds 4.

As described above, the tire T inside the curing apparatus 1 is held in a state of being pressed by the side molds 2, 3, the plurality of sector molds 4, and the bladder 10. Further, the tire T is heated by the heating medium supplied into the heating chambers 2b, 3b in the side molds 2, 3, respectively, and the heating chamber 4b in the sector molds 4 and circulating therewithin as the curing progresses by degrees.

The heating medium supplied to the heating chambers 2b, 3b, and 4b is of a material that can serve as a heat source for transferring heat to the tire T. It is of a material different from that of the side molds 2, 3 and the sector molds 4. The heating medium to be used is mainly a high-temperature liquid, steam, inert gas, or the like. It is to be noted that the heating medium is acceptable if it contains a material at least different from that of the base mold 20 or the pattern mold 30 constituting the sector mold 4. That is, the heating medium may be a powder or granular material of metal, resin, or other solid, a liquid, such as water or oil, a gas, such as steam or inert gas, or a mixture of those materials.

The not-shown heat source supply unit has a controller for regulating the temperature and the supply rate of the heating medium to be supplied into the heating chambers 2b, 3b, and 4b. The controller controls the temperature and the supply rate of the heating medium to be supplied into the heating chambers 2b, 3b, and 4b by controlling the heating section for regulating the temperature of the heating medium and the flow regulating valve disposed on the supply tube.

The lower side mold 2 and the bead ring 8a are gradually heated by the heating medium supplied into the heating chamber 2b. The heat transferred to the side mold 2 is transferred mainly to the side region S1 of the tire T, which is in contact with the molding surface 2a of the side mold 2, thus accelerating the curing of the side region S1. Also, the heat transferred to the bead ring 8a is transferred mainly to one of the bead regions Tb, Tb of the tire T, which is in contact with the bead ring 8a, thus accelerating the curing of one of the bead region Tb, Tb.

The upper side mold 3 and the bead ring 8b are gradually heated by the heating medium supplied into the heating chamber 3b. The heat transferred to the side mold 3 is transferred mainly to the side region S2 of the tire T, which is in contact with the molding surface 3a of the side mold 3, thus accelerating the curing of the side region S2. Also, the heat transferred to the bead ring 8b is transferred mainly to the other of the bead regions Tb, Tb of the tire T, which is in contact with the bead ring 8b, thus accelerating the curing of the other of the bead region Tb, Tb.

The sector molds 4 are gradually heated by the heating medium supplied into the heating chamber 4b. The heat transferred to the sector molds 4 is transferred mainly to the crown region C1 of the tire T through the pattern molding surface 4a of the sector molds 4, thus accelerating the curing of the crown region C1.

Figure 11:
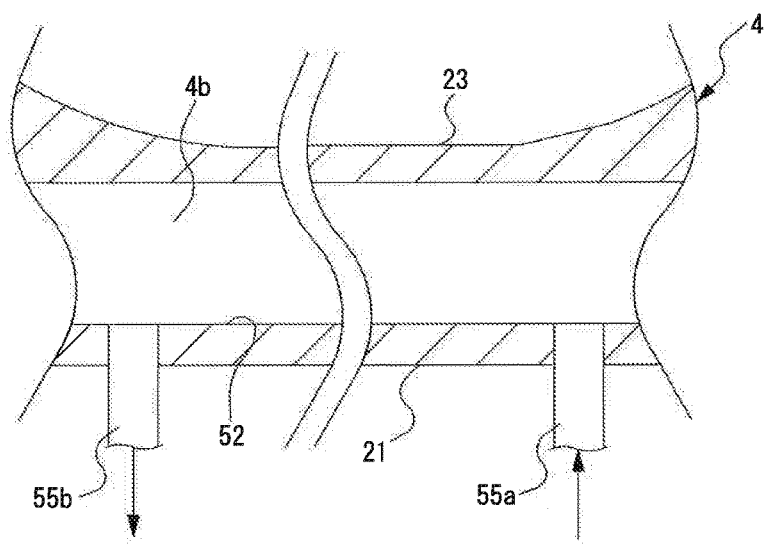
FIG. 11 is a partial enlargement of a sector mold.

FIG. 11 is a partially enlarged view of the sector mold 4.

As shown in FIG. 11, the sector mold 4 has a heating medium supply channel 55a and a heating medium discharge channel 55b formed therein as heating medium supply/discharge channels that can communicate the heating chamber 4b with the outside. The heating medium supply channel 55a and the heating medium discharge channel 55b are pipe conduits that lead from a peripheral surface 21 of the sector mold 4 to a radially outer surface 52 defining the shape of the heating chamber 4b. They are, for instance, of the same metallic material as the sector mold 4. It is to be appreciated that the numbers and the positions of the heating medium supply channel 55a and the heating medium discharge channel 55b are not subject to any limitations. For example, a plurality of them may be formed along the axial direction or circumferential direction of the heating chamber 4b.

The heating medium supply channel 55a, which connects a not-shown heating source supply unit to the heating chamber 4b, supplies the heating medium supplied from the heating source supply unit into the heating chamber 4b. The heating medium discharge channel 55b, which connects the heating chamber 4b to the not-shown heating source supply unit, discharges the heating medium in the heating chamber 4b to the heating source supply unit. That is, the heating medium is supplied from the heating source supply unit to the heating chamber 4b via the heating medium supply channel 55a, and, after circulating within the heating chamber 4b, discharged to the heating source supply unit via the heating medium discharge channel 55b. And, at this time, the heating chamber 4b serves as a flow channel for moving and circulating the heating medium. In this manner, as the heating medium supply channel 55a and the heating medium discharge channel 55b are provided that communicate the heating chamber 4b forked inside of the sector mold 4 with the outside of the sector mold 4. As a result, the heating medium can circulate within the heating chamber 4b, thus keeping the quantity of heat of the heating medium constant.

It is to be noted that the description of the heating medium supply channel 55a and the heating medium discharge channel 55b has been based on the case of them provided in the sector mold 4. However, they are not limited to being in the sector mold 4, and they may be provided in a similar manner in the side molds 2, 3 as well.

Figure 2:
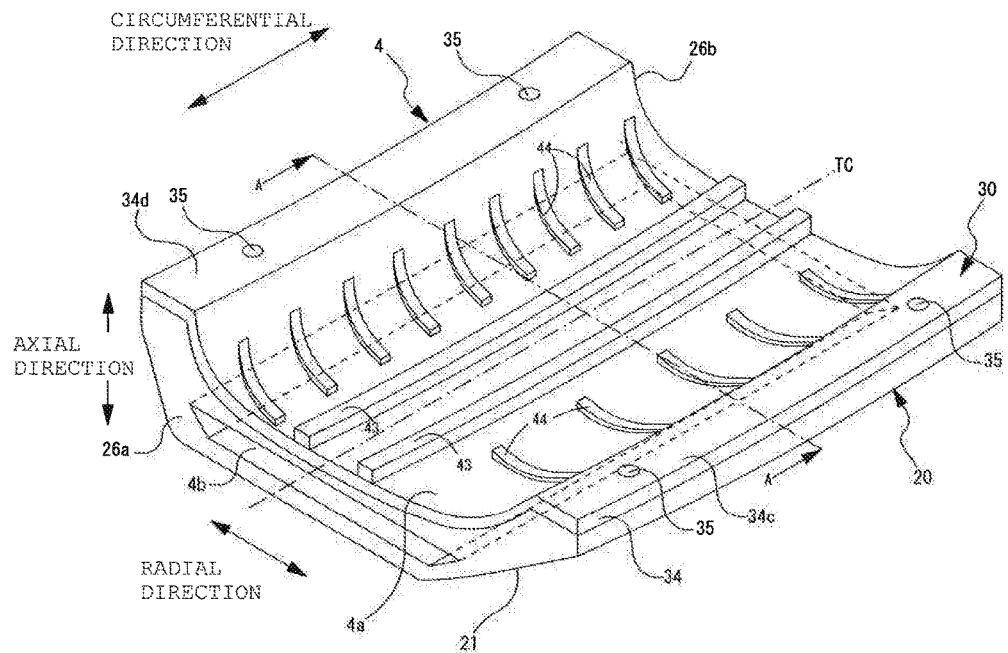
FIG. 2 is an overall perspective view showing a sector mold.
Figure 3:
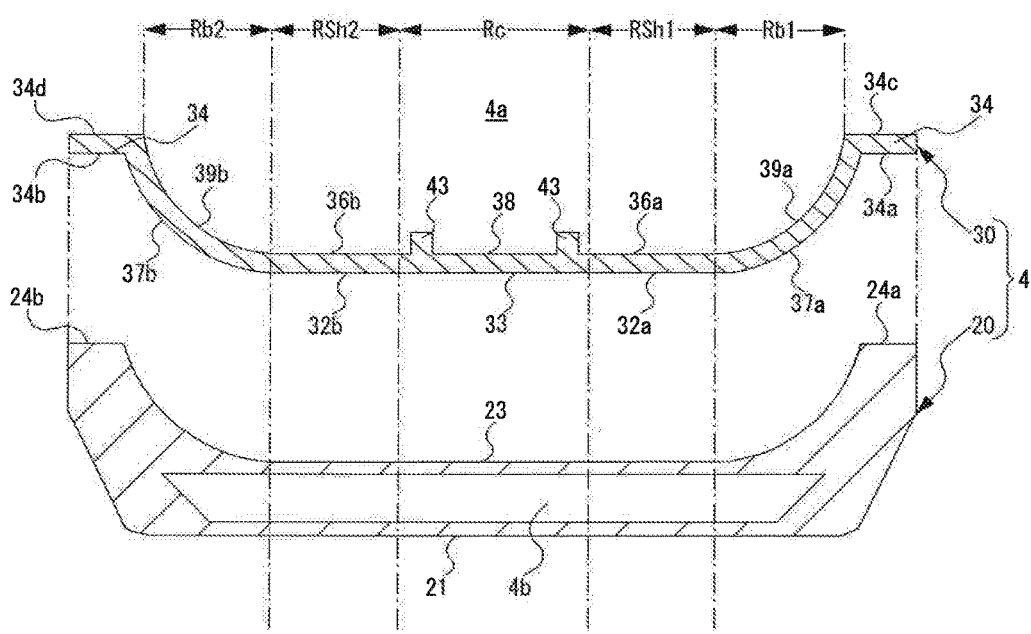
FIG. 3 is an axial cross section (section A-A in FIG. 2) of the sector mold.

FIG. 2 is a schematic perspective view showing one sector mold 4 out of the plurality of sector molds 4. FIG. 3 is an axial cross section (A-A of FIG. 2) of the sector mold 4.

Hereinbelow, a detailed description is given of the structure of the sector mold 4 with reference to FIG. 2 and FIG. 3. It is to be noted that the extents of a center area CCe and shoulder areas CSh1, CSh2 change with the profile shape of the crown region C1 of the tire T. In this specification, however, it is assumed that the center area CCe is at least an area astride the axial center (tire center) of the crown region C1 of the tire T and the shoulder areas CSh1, CSh2 are the remaining areas excluding the center area CCe. Also, the following description concerns mainly the details of the base mold 20 and the pattern mold 30 of the sector mold 4. But the side molds 2, 3 are also each comprised of the base mold 20 and the pattern mold 30 as with the sector mold 4.

As shown in FIG. 2, the sector mold 4 is structured as an assembly of the base mold 20 as a metallic base member and the pattern mold 30 having the pattern molding surface 4a as already described. The base mold 20 and the pattern mold 30 are made of a metallic material, such as aluminum, iron, or stainless steel, different from the material of the heating medium. Also, although the details will be discussed later, the base mold 20 and the pattern mold 30 can be molded by a general metal casting process or an additive manufacturing process to be discussed later, according to the basic models of the sector mold 4 such as 3D CAD data. Hereinbelow, a description is given of the specific shapes of the base mold 20 and the pattern mold 30.

As shown in FIG. 3, the base mold 20 as the base member is shaped in correspondence to the inner periphery 9b of the segment 9 and has an outer periphery 21 held face to face with the inner periphery 9b. The outer periphery 21, having a shape corresponding to the inner periphery 9b of the segment 9, comes into close contact with the inner periphery 9b of the segment 9. Formed on the side of the base mold 20 opposite to the outer periphery 21 thereof is a fitting surface 23 for supporting the pattern mold 30. The fitting surface 23 is an axially curved surface having the curvatures substantially the same as those of a center-area outer periphery 33 corresponding to a center molding range Rc and shoulder-area outer peripheries 32a, 32b corresponding to shoulder molding ranges RSh1, RSh2 of the pattern mold 30 and buttress-area outer peripheries 37a, 37b corresponding to buttress molding ranges Rb1, Rb2 thereof. With the pattern mold 30 fitted to the base mold 20, the fitting surface 23 comes in close contact with the ranges of the center-area outer periphery 33, the shoulder-area outer peripheries 32a, 32b and the buttress-area outer peripheries 37a, 37b of the pattern mold 30. Formed on the axially outer sides of the fitting surface 23 are joining surfaces 24a, 24b that come in contact with outer joining surfaces 34a, 34b, respectively, of joining flanges 34, 34 of the pattern mold 30.

As shown in FIG. 2, a plurality of bolt holes (not shown) in positions corresponding to the plurality of bolt holes 35 penetrating the joining flanges 34, 34 of the pattern mold 30 are provided in the joining surfaces 24a, 24b. The assembly of the base mold 20 and the pattern mold 30 is done by aligning the plurality of bolt holes 35 in the pattern mold 30 with the not-shown plurality of bolt holes in the base mold 20 and screwing in the not-shown bolts from the bolt holes 35 side.

As shown in FIG. 2 and FIG. 3, the circumferential end faces 26a, 26b, which connect the outer periphery 21 with the fitting surface 23 and the joining surfaces 24a, 24b, are abutted on the circumferential end faces 26b, 26a of the base molds 20 of the respectively adjacent sector molds 4.

Formed inside the base mold 20 is the afore-described heating chamber 4b. The heating chamber 4b, which is located radially outside of the pattern molding surface 4a of the pattern mold 30, is an approximately inverted trapezoidal cavity extending axially in the sector mold. The heating chamber 4b, which is formed along the circumferential direction, for instance, extends from one end to the other end of the base mold 20 constituting a part of the sector mold 4. And the heating chamber 4b is formed into a circular ring with the end surfaces 26a, 26b abutting on the adjacent end surfaces 26b, 26a. Also, provided at one end of the heating chamber 4b is the heating medium supply channel 55a, and provided at the other end thereof is the heating medium discharge channel 55b, as the afore-described heating medium supply/discharge channels. And the heating medium is supplied from the not-shown heating source supply unit via the heating medium supply channel 55a and the heating medium discharge channel 55b. It is to be noted that the extension direction of the heating chamber 4b is not limited to the circumferential direction, but may be the axial direction, the radial direction, or an oblique direction.

Next, a description is given of the pattern mold 30 to be fitted to the base mold 20.

As already described, the pattern mold 30 has the center-area outer periphery 33, the shoulder-area outer peripheries 32a, 32b, and the buttress-area outer peripheries 37a, 37b, which come in contact with the fitting surface 23, respectively. The center-area outer periphery 33, the shoulder-area outer peripheries 32a, 32b, and the buttress-area outer peripheries 37a, 37b correspond to the center molding range Rc, the shoulder molding ranges RSh1, RSh2, and the buttress molding ranges Rb1, Rb2, respectively.

Formed continuously on the opposite side of the center-area outer periphery 33, the shoulder-area outer peripheries 32a, 32b, and the buttress-area outer peripheries 37a, 37b of the pattern mold 30 are the center-area inner periphery 38, the shoulder-area inner peripheries 36a, 36b, and the buttress-area inner peripheries 39a, 39b, respectively, constituting the afore-described pattern molding surface 4a.

As shown in FIG. 2 and FIG. 3, formed on the center-area inner periphery 38 are a plurality of main groove molding projections 43. The plurality of main groove molding projections 43 extend continuously in the circumferential direction on the center-area inner periphery 38 and are formed at equal distances from the tire center TC therebetween. Also, a plurality of lateral groove molding projections 44 are formed on the shoulder-area inner peripheries 36a and 36b. The plurality of lateral groove molding projections 44 are arranged at equal intervals in the circumferential direction on the shoulder-area inner peripheries 36a, 36b and extend in arcs from the main groove molding projection 43 side toward the joining inner faces 34c, 34d, respectively. In this manner, provided on the shoulder-area inner peripheries 36a, 36b and the center-area inner periphery 38 constituting the pattern molding surface 4a are projections that mold a desired tread pattern on the crown region C1 of the tire T to be cured. And with the tire T cured, as it is pressed against the pattern molding surface 4a, the crown region C1 of the tire T will have a tread pattern formed that has a contact patch surface having lands and grooves in the inverted shapes of the above-mentioned projections. It should be noted, however, that the shape of the pattern molding surface 4a here is an example only. And it is possible to mold various tread patterns on the outer periphery of the crown region C1 by changing the number, shape, and dimensions of the main groove molding projections 43 and the lateral groove molding projections 44 and other factors. Also, although not shown in the illustration, predetermined projections and recesses are formed on the buttress-area inner peripheries 39a, 39b as well.

As described above, as hollow cavities capable of circulating a heating medium, the heating chambers 2b, 3b are formed inside the side molds 2, 3, and the heating chamber 4b is formed inside the sector mold 4. Then, compared with the conventional case where the heating chambers are formed in the base 5, the outer ring 7, and the arm 11, the distance between the heating chambers 2b, 3b, 4b and the tire T is closer such that the heat of the heating medium held in the heating chambers 2b, 3b, 4b can be better transferred to the tire T via the side molds 2, 3 and the sector mold 4. Thus the heat is transferred to the tire T faster, and there will be less energy loss due to heat dissipation, etc., resulting from curing, which improves the curing efficiency.

Also, the heating chambers 2b, 3b, 4b formed inside the side molds 2, 3 and the sector mold 4 can make the size in the radial direction of the curing apparatus 1 smaller. This will reduce the use of materials in manufacturing the curing apparatus 1, thus lowering the manufacturing cost.

Second Embodiment

Figure 4A:
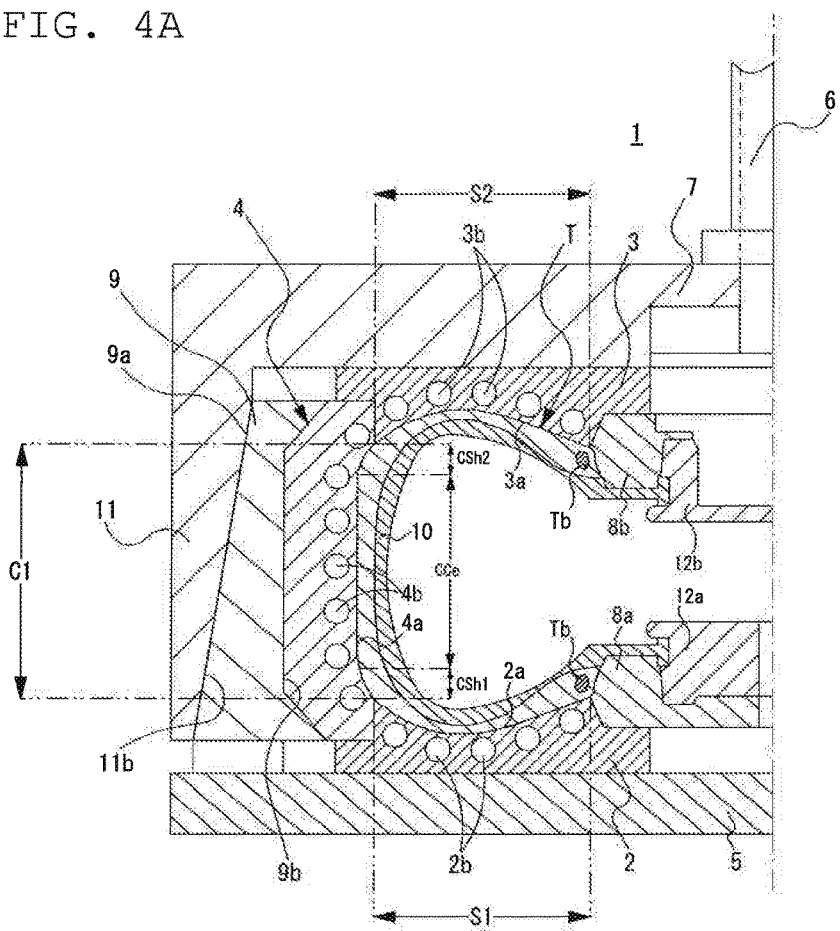
FIG. 4 shows an axial cross section of a curing apparatus according to another embodiment (second embodiment).
Figure 4B:
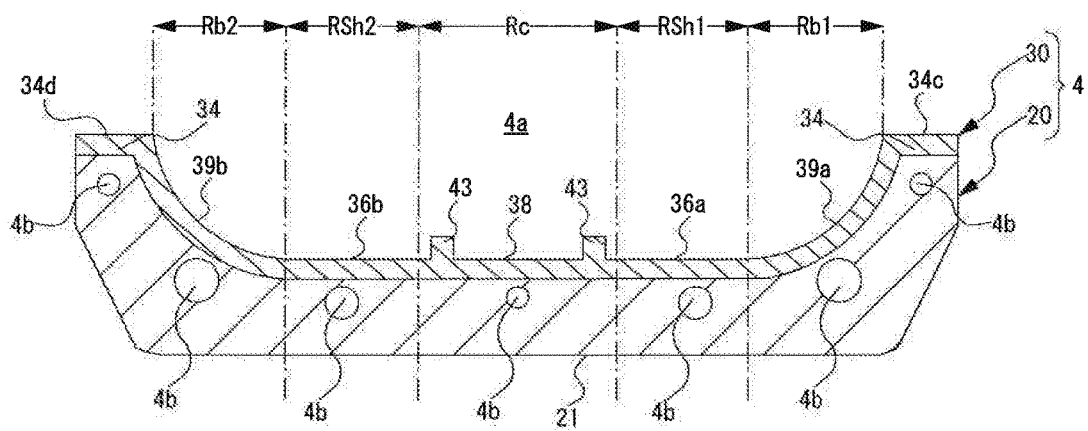

FIG. 4A is a schematic cross section showing a part of a curing apparatus 1 according to another embodiment. FIG. 4B is an axial cross section of a sector mold 4. The curing apparatus 1 according to this second embodiment differs from the curing apparatus 1 of the first embodiment in that a plurality of heating chambers 2b, 3b, 4b as hollow cavities are formed independently of each other. Note that the identical components in this embodiment are given the identical reference numerals and the repeated description thereof will be omitted.

Formed inside the side mold 2 and the side mold 3 of the curing apparatus 1 according to this embodiment are a plurality of heating chambers 2b and heating chambers 3b, which are each circular in cross section. The heating chambers 2b, 3b are annular flow channels extending within the side molds 2, 3. The heating chambers 2b and the heating chambers 2b are respectively formed radially separate from each other at predetermined intervals. Also, formed inside the sector mold 4 of the curing apparatus 1 are a plurality of heating chambers 4b, which are each circular in cross section. The heating chambers 4b are annular flow channels extending within the sector mold 4. The heating chambers 4b are formed axially separate from each other at predetermined intervals.

Provided at one end of each of the heating chambers 2b, 3b, 4b is the above-described heating medium supply channel 55a, and provided at the other end thereof is the heating medium discharge channel 55b. And the heating medium is supplied from the not-shown heating source supply unit to each of the heating chambers 2b, 3b,4b and the heating medium circulates therewithin. The heating chambers 2b, 3b,4b are independent of each other without communication therebetween. Therefore, the heating medium once supplied from the not-shown heating source supply unit into each of the heating chambers 2b, 3b,4b will never move to the other heating chambers throughout its travel.

In this manner, a plurality of each of heating chambers 2b, 3b, 4b are formed independently of each other. In this case, too, as with the first embodiment, the distance between the heating chambers 2b, 3b, 4b and the tire T is close enough to improve the curing efficiency. Also, the heating chambers 2b, 3b, 4b may be formed in optional positions in the side molds 2, 3 and the sector mold 4, respectively, thus improving the design freedom of the curing apparatus 1. It is to be appreciated that the shape, size, and number of the heating chambers 2b, 3b, 4b are not limited to those shown in the illustrations, but may be changeable as appropriate according to the size and use of the tire T. More specifically, the sectional shape of the cooling chambers 2c, 3c, 4c may be circular, elliptical, polygonal, wavy, etc., and the size thereof may be also optional. For example, even when cooling chambers 2c, 3c, 4c circular in cross section are employed, the diameter thereof may vary between the cooling chambers 2c, 3c, 4c. This is because the optimum curing conditions can vary with the positions, such as the side regions S1, S2 and the crown region C1, of the tire T.

Third Embodiment

Figure 5A:
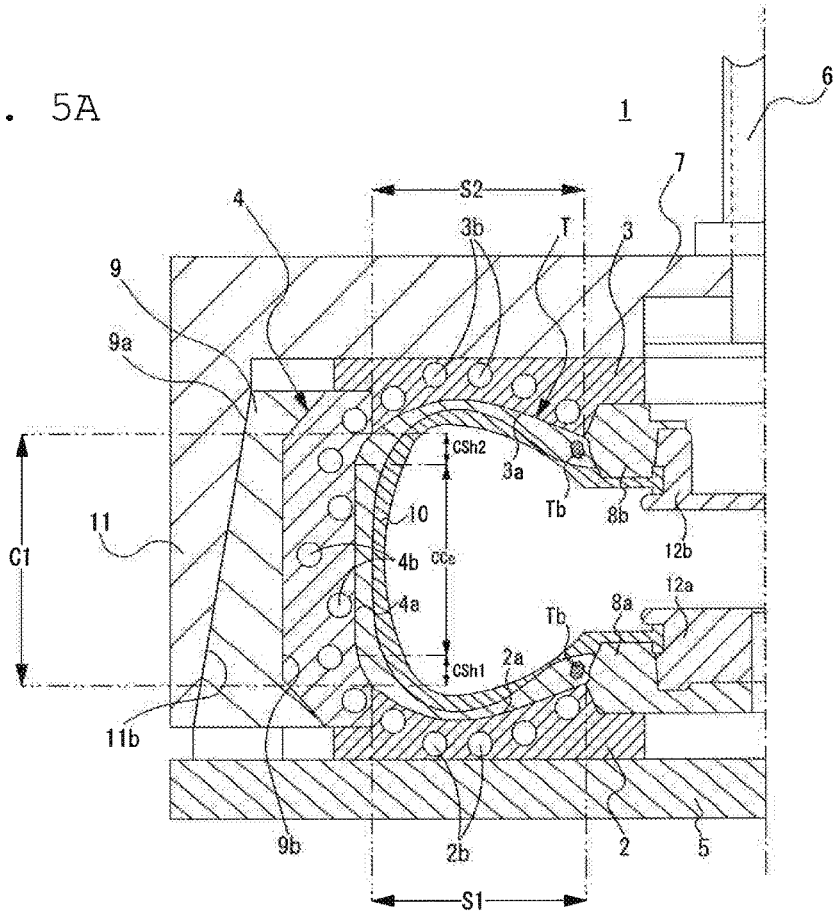
FIG. 5 shows a curing apparatus and a sector mold according to another embodiment (third embodiment).
Figure 5B:
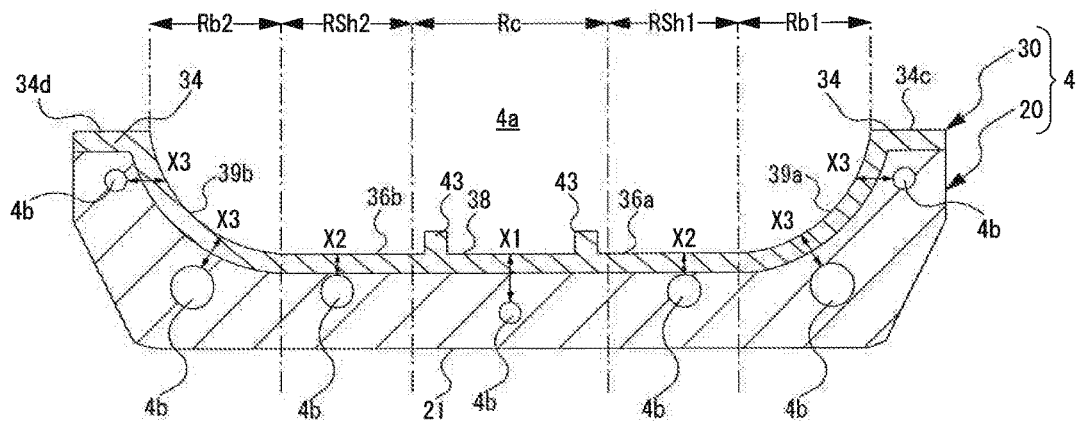

FIG. 5A is a schematic cross section showing a part of a curing apparatus 1 according to still another embodiment. FIG. 5B is an axial cross section of a sector mold 4. The curing apparatus 1 according to this third embodiment differs from the curing apparatus 1 of the second embodiment in that the distance between the heating chambers 2b, 3b, 4b and the pattern molding surface 4a varies from region to region of the sector mold 4. It is to be noted that the constitution other than the distance between the heating chambers 2b, 3b, 4b and the pattern molding surface 4a is the same as the constitution of the second embodiment.

As shown in FIG. 5B, the heating chambers 4b of the curing apparatus 1 of the third embodiment are provided such that the distances X1, X2, X3 between the peripheries of the heating chambers 4b and the molding surface 4a of the sector mold 4 (the center-area inner periphery 38, the shoulder-area inner peripheries 36a, 36b, and the buttress-area inner peripheries 39a, 39b of the pattern mold 30) vary with the regions (gauge thicknesses of the tire T) where the heating chambers 4b are formed. More specifically, the distance X1 of the heating chamber 4b formed in the center molding range Rc with the thinnest gauge thickness of the tire T is set to be the farthest. The distance X2 of the heating chambers 4b formed in the shoulder molding ranges RSh1, RSh2 with the thickest gauge thickness of the tire T is set to be the closest. And the distance X3 of the heating chambers 4b formed in the buttress molding ranges Rb1, Rb2 with the gauge thickness thicker than the center molding range Rc and thinner than the shoulder molding ranges RSh1, RSh2 is set to be closer than the distance X1 and farther than the distance X2. It is to be noted that the distances X1, X2, X3 are distances in the normal direction of the pattern molding surface 4a of the tire T ((the center-area inner periphery 38, the shoulder-area inner peripheries 36a, 36b, and the buttress-area inner peripheries 39a, 39b, respectively).

Also, the heating chambers 2b, 3b as shown in FIG. 5A, in a similar manner, have the distances between the molding surfaces 2a, 3a of the side molds 2, 3 and the peripheries of the heating chambers 2b, 3b varying according to the gauge thickness of the tire T. More specifically, near the bead region Tb and the shoulder molding ranges RSh1, RSh2 with thicker gauge thickness of the tire T, the distances between the molding surfaces 2a, 3a and the heating chambers 2b, 3b are set to be closer. On the other hand, in the middle positions of the side regions S1, S2 of the tire T with thinner gauge thickness, the distances between the molding surfaces 2a, 3a and the heating chambers 2b, 3b are set to be farther.

Figure 13A:
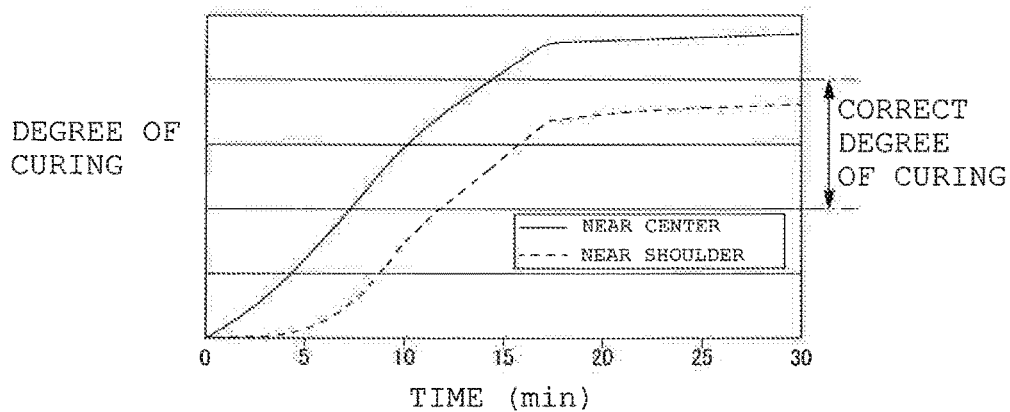
FIG. 13 shows graphs illustrating changes in curing degree with time.
Figure 13B:
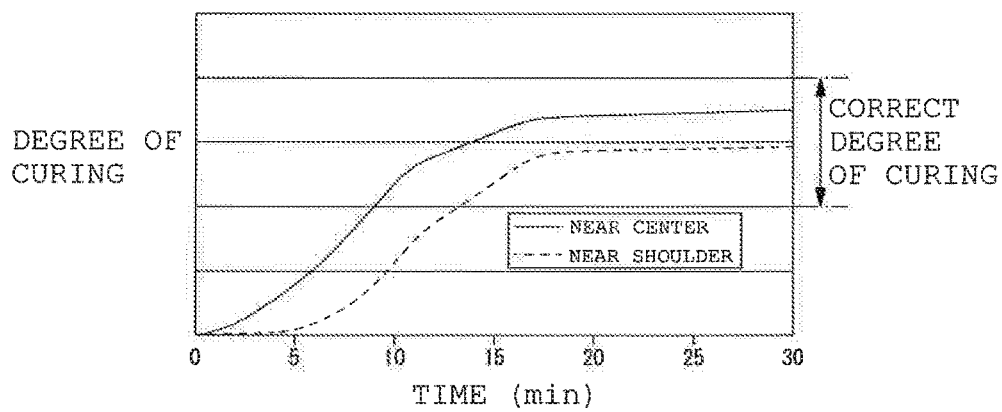

FIG. 13A is a graph showing the change in the degree of curing with time of the center area CCe and the shoulder areas CSh1 and CSh2 of the crown region C1 of the tire cured by a conventional curing apparatus which gives a uniform quantity of heat to all regions of the tire. FIG. 13B is a graph showing the change in the degree of curing with time of the center area CCe and the shoulder areas CSh1 and CSh2 of the crown region C1 of the tire cured by a curing apparatus 1 which is equipped with the sector molds 4 according to the foregoing third embodiment.

As shown in FIG. 13A, when the conventional curing apparatus is used, the quantity of heat given from the mold to the uncured tire T is dependent on the distance between the pattern molding surface 4a and the heating chamber 4b and is therefore approximately uniform irrespective of the regions of the tire T. More specifically, mainly due to the difference in the gauge thickness of rubber, the degree of curing near the center area with thinner gauge thickness rises faster than in the shoulder area with thicker gauge thickness. And when a correct degree of curing is reached in the shoulder area with thicker gauge thickness, the degree of curing in the center area tends to exceed the correct degree of curing. Thus it is difficult to achieve an optimum degree of curing at the same time near the center and shoulder areas.

On the other hand, as shown in FIG. 13B, with the curing apparatus 1 according to the third embodiment, the shoulder areas CSh1, CSh2 with thicker gauge thickness have a close distance between the pattern molding surface 4a and the heating chamber 4b. As a result, the heat is fast transferred to the tire T, and the heating temperature and the degree of curing of the tire T rise fast. On the other hand, in the center area CCe having thinner gauge thickness, the distance between the pattern molding surface 4a and the heating chamber 4b is far. As a result, the heat is more slowly transferred to the tire T, and the rise in the heating temperature and the degree of curing of the tire T takes time. It is therefore confirmed that the degrees of curing in the center area CCe and the shoulder areas CSh1, CSh2 are both within an appropriate range at the predetermined time (e.g., 30 minutes) elapsed from the start of curing.

As described above, according to the curing apparatus 1 of the third embodiment, the curing efficiency can be improved. Moreover, the distances X1, X2, X3 between the heating chambers 2b, 3b, 4b and the molding surface 2a, 3a and the pattern molding surface 4a can be set optionally for different regions the tire T. As a result, the curing temperature may be set precisely for different regions the tire T, thus making it possible to achieve optimum degrees of curing for the entirety of the tire T.

Fourth Embodiment

Figure 6A:
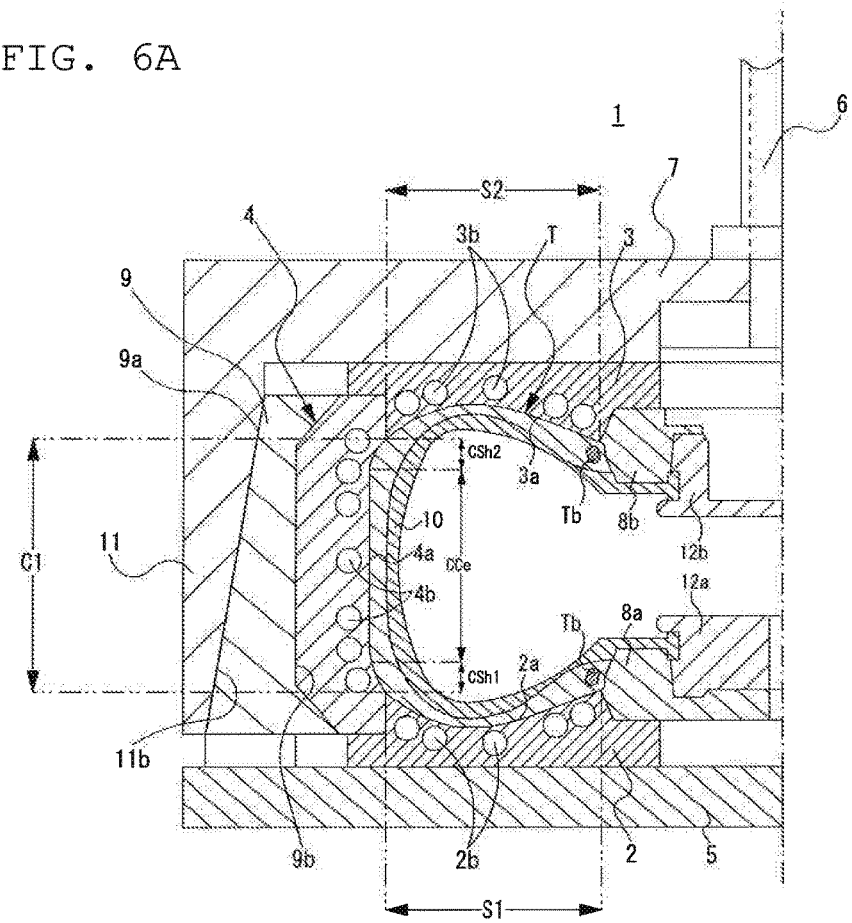
FIG. 6 shows a curing apparatus and a sector mold according to another embodiment (fourth embodiment).
Figure 6B:
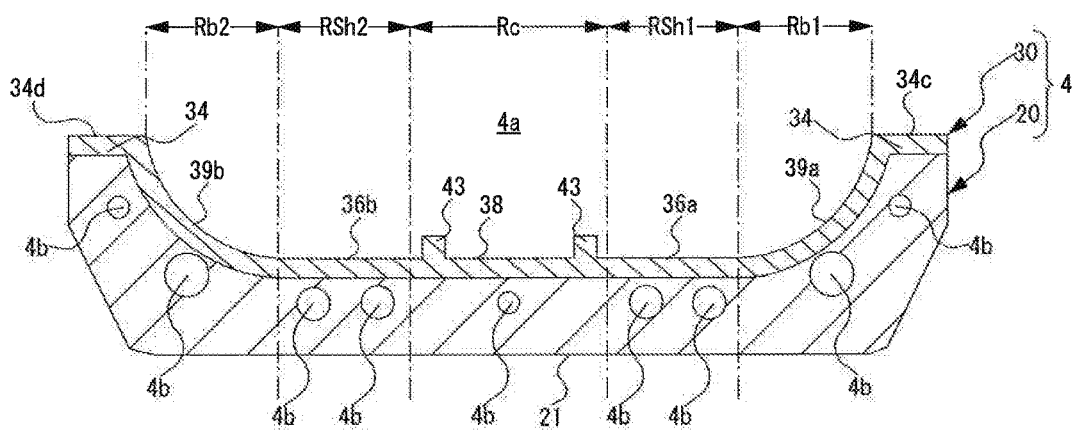

FIG. 6A is a schematic cross section showing a part of a curing apparatus 1 according to still another embodiment. FIG. 6B is an axial cross section of a sector mold 4. The curing apparatus 1 according to this fourth embodiment differs from the curing apparatus 1 of the second embodiment in that the location densities of the heating chambers 2b, 3b, 4b vary with the regions of the sector mold 4.

As shown in FIG. 6B, with the curing apparatus 1 of this fourth embodiment, the heating chambers 4b are formed inside the sector mold such that the distance (location density) between the heating chambers 4b themselves varies according to the gauge thickness of the tire T. More specifically, the location density of the heating chambers 4b formed in the center molding range Rc with thinner gauge thickness of the tire T is set to be the widest apart. The location density of the heating chambers 4b formed in the shoulder molding ranges RSh1, RSh2 with thicker gauge thickness of the tire T is set to be the closest. And the location density of the heating chambers 4b formed in the buttress molding ranges Rb1, Rb2 with the gauge thickness thicker than the center molding range Rc and thinner than the shoulder molding ranges RSh1, RSh2 is set to be closer than the location density in the center molding range Rc and wider apart than that in the location density in the buttress molding ranges Rb1, Rb2.

Also, the heating chambers 2b, 3b as shown in FIG. 6A are similarly provided such that the location density between themselves varies according to the gauge thickness of the tire T. More specifically, the location density of the heating chambers 4b formed in the center molding range Rc with thinner gauge thickness of the tire T is set to be the widest apart. The location density of the heating chambers 2b, 3b formed near the bead regions Tb and the shoulder areas CSh1, CSh2 with thicker gauge thickness of the tire T is set to be closer. Contrary to this, the location density of the heating chambers 2b, 3b formed in the middle position of the side regions S1, S2 with thinner gauge thickness of the tire T is set to be wider apart.

As described above, according to the curing apparatus 1 of the present embodiment, the curing efficiency can be improved. Moreover, the location density between the heating chambers 2b, 3b, 4b can be changed for different regions (gauge thicknesses) of the uncured tire T. As a result, the curing temperature may be set precisely for different regions the tire T, thus making it possible to achieve optimum degrees of curing for the entirety of the tire T.

Fifth Embodiment

Figure 7A:
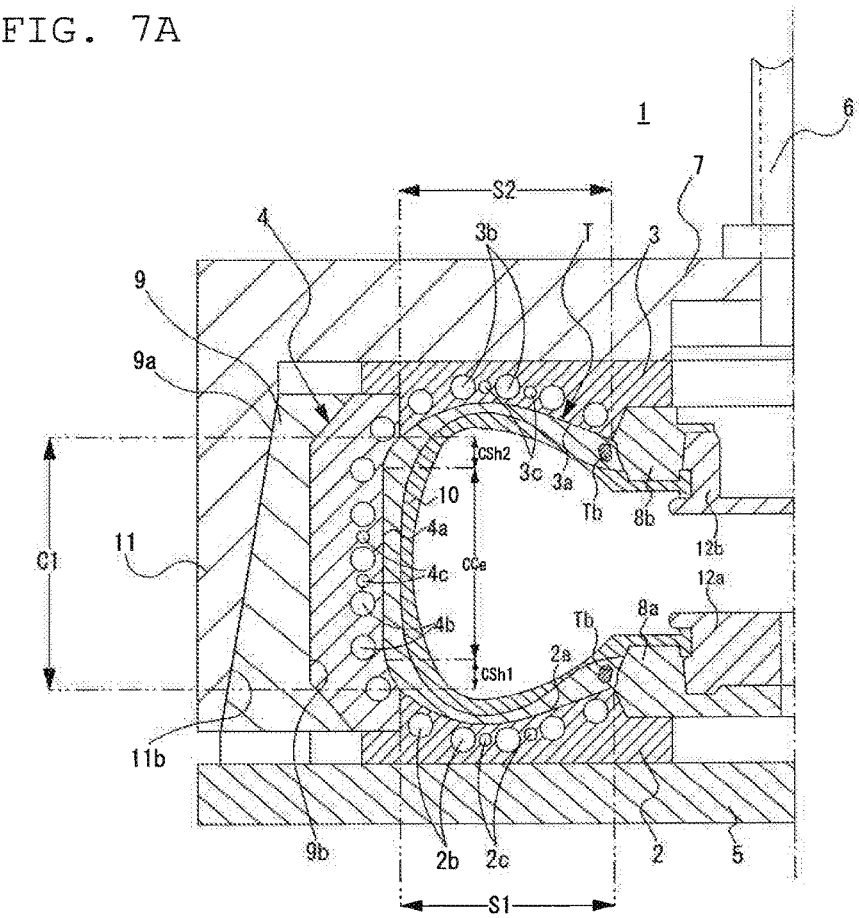
FIG. 7 shows an axial cross section of a curing apparatus according to another embodiment (fifth embodiment).
Figure 7B:
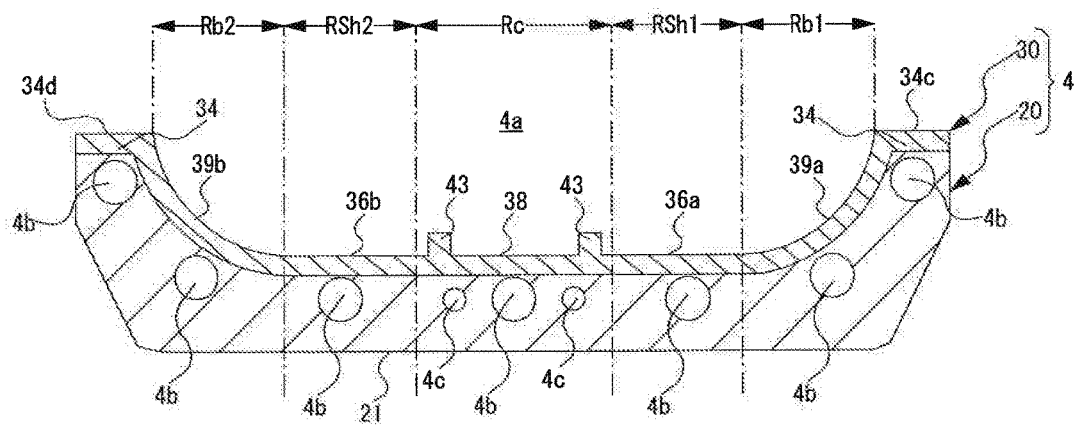

FIG. 7A is a schematic cross section showing a part of a curing apparatus 1 according to still another embodiment. FIG. 7B is an axial cross section of a sector mold 4. The curing apparatus 1 according to this fifth embodiment differs from the curing apparatus 1 of the second embodiment in that the cooling chambers 2c, 3c, 4c as hollow cavities to hold a cooling medium are formed inside the side molds 2, 3 and the sector mold 4.

With the curing apparatus 1 according to this embodiment, a plurality of cooling chambers 2c and cooling chambers 3c, circular in cross section, are formed in the side molds 2, 3, respectively. The cooling chambers 2c, 3c are annular flow channels extending within the side molds 2, 3 in parallel with the heating chambers 2b, 3b. The cooling chambers 2c, 3c are respectively formed a predetermined interval apart from each other radially. Also, the cooling chambers 2c, 3c are provided, for instance, near the middle of the side regions S1, S2 where the gauge thickness of the tire T is thinner and are of smaller diameter than the heating chambers 2b, 3b.

A plurality of cooling chambers 4c, circular in cross section, are formed in the sector mold 4. The cooling chambers 4c are annular flow channels extending within the sector mold 4 in parallel with the heating chambers 4b. The cooling chambers 4c are formed a predetermined interval apart from each other radially. Also, the cooling chambers 4c are provided, for instance, in the center molding range Rc of the sector mold 4 where the gauge thickness of the tire T is thinner and are of smaller diameter than the heating chambers 4b. Also, the cooling chambers 2c, 3c, 4c are connected with not-shown supply tubes and discharge tubes. And a cooling medium is supplied to the cooling chambers 2c, 3c, 4c from a not-shown cooling medium supply unit via the supply tubes and discharged from the cooling chambers 2c, 3c, 4c to the cooling medium supply unit via the discharge tubes.

The cooling medium to be supplied to the cooling chambers 2c, 3c, 4c is of a material capable of drawing heat from the tire T heated by the heating medium via the side molds 2, 3 and the sector mold 4. The material should be different from the material of the side molds 2, 3 and the sector mold 4. The cooling medium to be used is, for instance, a low-temperature liquid or gas. And the cooling medium is acceptable if it contains a material at least different from that of the base mold 20 or the pattern mold 30 constituting the sector mold 4. That is, the cooling medium may be a solid such as metal or resin, a liquid such as water or oil, a gas such as inert gas, or a mixture of those materials.

The not-shown cooling medium supply unit has a controller for regulating the temperature and the supply rate of the cooling medium to be supplied into the cooling chambers 2c, 3c, 4c. The controller controls the temperature and the supply rate of the cooling medium to be supplied into the cooling chambers 2c, 3c, 4c by controlling the cooling section for regulating the temperature of the cooling medium and the flow regulating valve disposed on the supply tube.

The neighborhood of the middle positions of the side regions S1, S2 of the side molds 2, 3 heated by the heating chambers 2b, 3b is gradually cooled by the cooling medium supplied into the cooling chambers 2c, 3c. Also, the neighborhood of the center molding range Rc of the sector mold 4 heated by the heating chambers 4b is gradually cooled by the cooling medium supplied into the cooling chambers 4c. With the curing apparatus 1 of this fifth embodiment, the degree of curing rises quickly in the shoulder areas CSh1, CSh2 with thicker gauge thickness where the cooling chambers 2c, 3c, 4c are not provided. Contrary to this, the rise in the degree of curing takes time in the center area CCe with thinner gauge thickness where the cooling chambers 2c, 3c, 4c are provided and consequently the heat near the center area CCe is drawn by the cooling medium in the cooling chambers 2c, 3c, 4c.

As described above, according to the curing apparatus 1 of the present embodiment, the curing efficiency can be improved. Moreover, the heat in the tire T is drawn by the cooling medium in the cooling chambers 2c, 3c, 4c via the side molds 2, 3 and the sector mold 4. As a result, the curing temperature may be set precisely for different regions the tire T, thus making it possible to achieve optimum degrees of curing for the entirety of the tire T.

Sixth Embodiment

Figure 8:
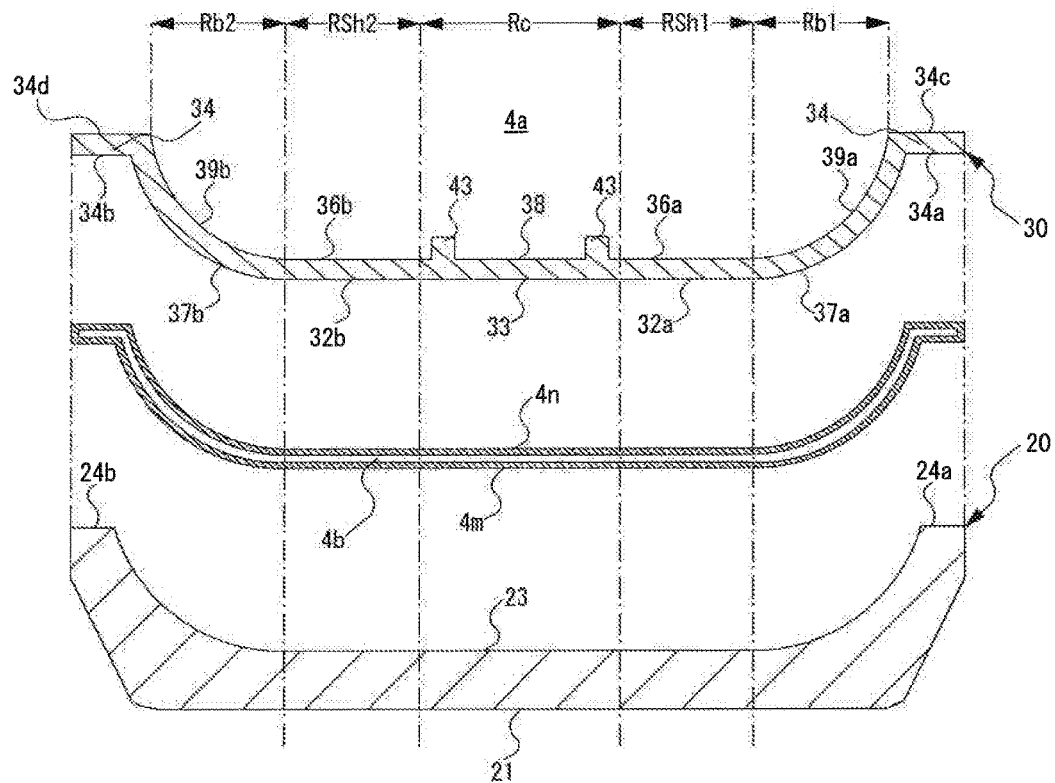
FIG. 8 is an axial cross section of a sector mold according to another embodiment (sixth embodiment).

FIG. 8 is an axial cross section of a sector mold 4 according to still another embodiment. The curing apparatus 1 according to this sixth embodiment differs from the curing apparatus 1 of the first embodiment in that the heating chamber 4b resides not inside the base mold 20 or the pattern mold 30, constituting the sector mold 4, but sandwiched between the base mold 20 and the pattern mold 30. Note that the description of the sixth to ninth embodiments covers the sector mold 4 principally, using the illustrations of the sector mold 4 only. However, the side molds 2, 3 may also be of similar constitution.

With the curing apparatus 1 of this embodiment, the heating chamber 4b is positioned between the fitting surface 23 of the base mold 20 and the center-area outer periphery 33, the shoulder-area outer peripheries 32a, 32b, and the buttress-area outer peripheries 37a, 37b of the pattern mold 30, and extends for the whole axial area of the sector mold 4. The outer periphery 4m of the heating chamber 4b is a surface curved along the axial direction at substantially the same curvature as that of the fitting surface 23. The inner periphery 4n of the heating chamber 4b is a surface curved along the axial direction at substantially the same curvatures as those of the center-area outer periphery 33, the shoulder-area outer peripheries 32a, 32b, and the buttress-area outer peripheries 37a, 37b of the pattern mold 30.

The constitution as described above realizes a close distance between the heating chamber 4b and the tire T as with each of foregoing embodiments. And the heat of the heating medium circulating inside the heating chamber 4b is transferred to the tire T via the sector mold 4. Thus there will be less energy loss due to heat dissipation, etc., which improves the curing efficiency.

It should be appreciated that the radial thickness of the heating chamber 4b may, for instance, be changed according to the gauge thickness of the tire T, which will change the amount of heating medium circulating inside the heating chamber 4b. As a result, the curing temperature may be set precisely for different regions of the tire T, thus making it possible to achieve optimum degrees of curing for the entirety of the tire T. As a result, the curing temperature may be set precisely for different regions of the tire T, thus making it possible to achieve optimum degrees of curing for the entirety of the tire T.

Seventh Embodiment

Figure 9:
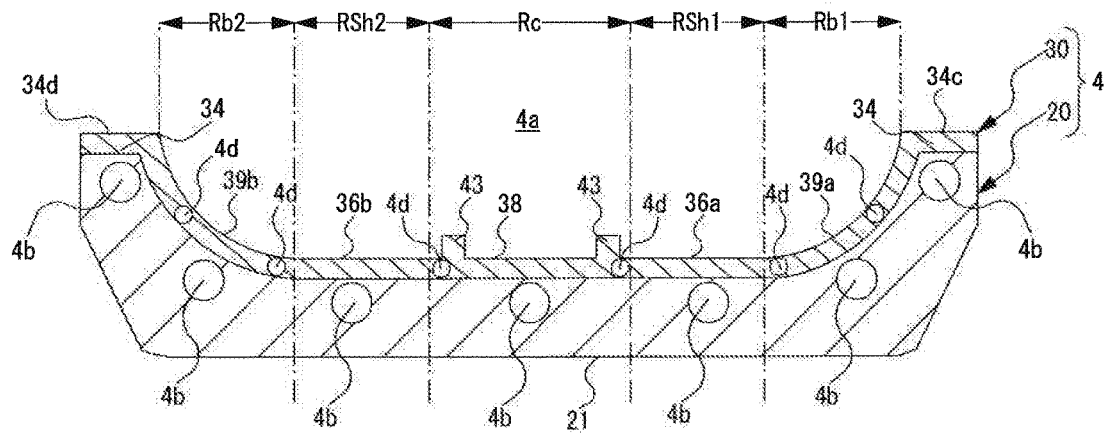
FIG. 9 is an axial cross section of a sector mold according to another embodiment (seventh embodiment).

FIG. 9 is an axial cross section of a sector mold 4 according to still another embodiment. The curing apparatus 1 according to this seventh embodiment differs from the curing apparatus 1 of the second embodiment in that the heating chambers 4d are formed in the pattern mold 30 as well. That is, the heating chambers 4b are formed in the base mold 20, and the heating chambers 4d in the pattern mold 30.

As shown in FIG. 9, formed inside the sector mold 4 are a plurality of heating chambers 4d, which are each circular in cross section. The heating chambers 4d are annular flow channels extending within the pattern mold 30 of the sector mold 4. The heating chambers 4d are formed axially separate from each other at predetermined intervals. The heating chambers 4d are of smaller diameter than the heating chambers 4b formed inside the base mold 20 and are in parallel with the heating chambers 4b. Also, the heating chambers 4d are located in areas between the neighboring heating chambers 4b, 4b in such a manner as to cover the areas where the heating chambers 4b are not formed.

As described above, the heating chambers 4b are formed in the base mold 20, and the heating chambers 4d in the pattern mold 30. Then the distance from the heating chambers 4b and the heating chambers 4d to the tire T becomes very close. This allows the heat of the heating medium circulating within the heating chambers 4b to be transferred more precisely to the tire T via sector mold 4. Thus there will be less energy loss due to heat dissipation, etc., which improves the curing efficiency. Also, the formation of the heating chambers 4d in addition of the heating chambers 4b in the sector mold 4 increases the quantity of heat to be transferred to the sector mold 4 and the tire T, thereby improving the curing speed.

It is to be noted that in this embodiment, the heating chambers 4b and the heating chambers 4d are formed in both the base mold 20 and pattern mold 30 constituting the sector mold 4. However, the arrangement may also be such that the heating chambers 4d are formed in the pattern mold 3 only, without forming the heating chambers 4b in the base mold 20.

Eighth Embodiment

Figure 10:
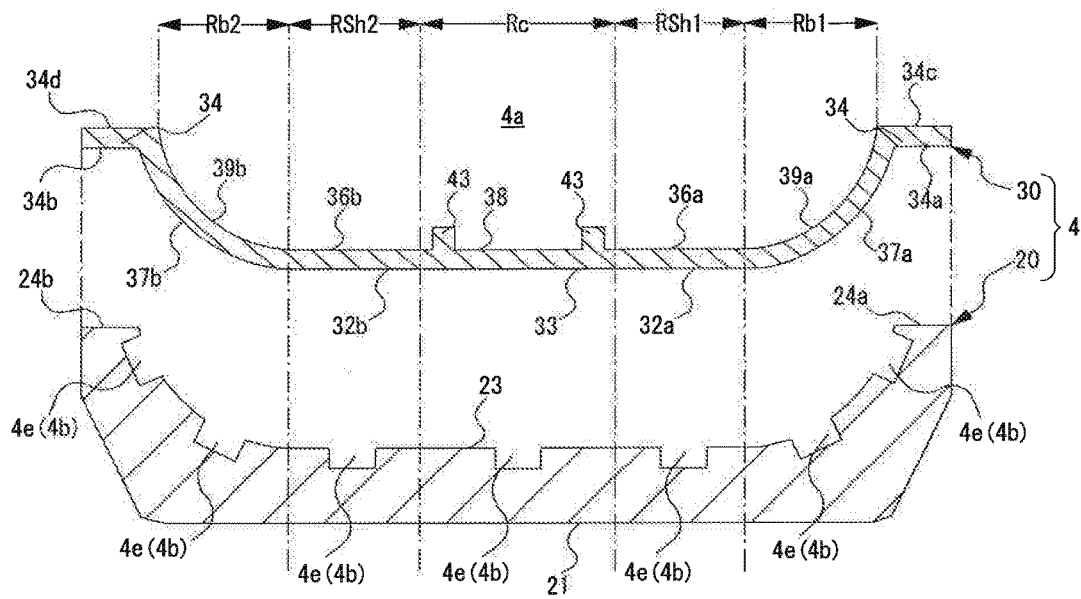
FIG. 10 is an axial cross section of a sector mold according to another embodiment (eighth embodiment).

FIG. 10 is an axial cross section of a sector mold 4 according to still another embodiment. The curing apparatus 1 according to this eighth embodiment differs from the curing apparatus 1 of the second embodiment in that holding recesses 4e are formed on the fitting surface 23 of the base mold 20.

As shown in FIG. 10, a plurality of holding recesses 4e, which are each recessed in the direction of the outer periphery 21 and open upward, are formed on the fitting surface 23 of the base mold 20. The holding recesses 4e, which are each rectangular in cross section, are formed axially at predetermined intervals between each other. With the pattern mold 30 fitted to the base mold 20, the heating chambers 4b are formed with the holding recesses 4e closed by the center-area outer periphery 33, the shoulder-area outer peripheries 32a, 32b, and the buttress-area outer peripheries 37a, 37b of the pattern mold 30. And a heating medium is supplied from a heating source supply unit into the heating chambers 4b formed by the holding recesses 4e of the base mold 20 and the pattern mold 30.

As described above, with the curing apparatus 1 according to this embodiment, too, the distance from the heating chambers 4b to the tire T becomes close, and as a result, the heat of the heating medium held within the heating chambers 4b can be transferred to the tire T via the sector mold 4. Thus there will be less energy loss due to heat dissipation, etc., resulting from curing, which improves the curing efficiency.

Ninth Embodiment

Now, still another embodiment of the sector mold 4 is explained with reference to FIG. 4. The curing apparatus 1 according to this ninth embodiment differs from the curing apparatus 1 of the second embodiment in that the temperature of the heating medium varies with different heating chambers 4b.

The curing apparatus 1 shown in FIG. 4 is such that the temperature of the heating medium circulating within the heating chambers 4b varies according to the different regions (gauge thicknesses of the tire T) of the sector mold 4. More specifically, the temperature of the heating medium circulating within the heating chambers 4b formed in the center molding range Rc with thinner gauge thickness of the tire T is set to be lower. Contrary to this, the temperature of the heating medium circulating within the heating chambers 4b formed in the shoulder molding ranges RSh1, RSh2 and the buttress molding ranges Rb1, Rb2, other than the center molding range Rc, with thicker gauge thickness of the tire T is set to be higher.

As described above, according to the curing apparatus 1 of the present embodiment, the curing efficiency can be improved. Moreover, the temperature of the heating medium can be set optionally according to the gauge thicknesses of the tire T. As a result, the curing temperature may be set precisely for different regions the tire T, thus making it possible to achieve optimum degrees of curing for the entirety of the tire T.

It is to be noted that in the ninth embodiment, the temperature of the heating medium is set differently at two positions, namely, in the center molding range Rc and in the ranges other than the center molding range Rc. However, the arrangement is not limited to this, and the temperature of the heating medium may be set differently at three or more positions. More specifically, the temperature of the heating medium circulating within the heating chambers 4b formed in the center molding range Rc with the thinnest gauge thickness of the tire T is set to be the lowest. The temperature of the heating medium circulating within the heating chambers 4b formed in the shoulder molding ranges RSh1, RSh2 with the thickest gauge thickness of the tire T is set to be the highest. And the temperature of the heating medium circulating within the heating chambers 4b formed in the buttress molding ranges Rb1, Rb2 is set to be higher than that in the center molding range Rc and lower than that in the shoulder molding ranges RSh1, RSh2. In this manner, the curing temperature can be set more precisely.

Method for Manufacturing

Now, a description is given of a principal method for manufacturing the side molds 2, 3 and the sector mold 4, using the sector mold 4 according to the first embodiment as an example.

As already mentioned, the sector mold 4 is manufactured using a general metal casting process or an additive manufacturing process. In the additive manufacturing process in particular, the master data for the sector mold 4 consisting of three-dimensional CAD data or the like is converted into a plurality of slice data (lamination data). Then the layers corresponding to the shape of the sector mold 4 represented by the converted slice data are laminated layer by layer. And the entire shape of the sector mold 4 represented by the master data is formed into the sector mold 4. Also, in the present example, the sector mold 4 consists of a combination of a base mold 20 and a pattern mold 30 mating therewith. Therefore, one master data corresponding to the sector mold 4 is divided into separate master data corresponding to the base mold 20 and the pattern mold 30, respectively.

Also, certain desirable methods are employable as the additive manufacturing process in manufacturing the base mold 20 and the pattern mold 30. In one of such methods, the layers corresponding to the shape represented by the respective slice data are formed into a shape successively as the metal powder, injected under irradiation of laser light, is melted and fused together in a molding machine which receives a plurality of slice data. In another, the layers corresponding to the shape represented by the respective slice data are formed into a shape as the metal powder, which has been placed in a chamber in advance, is irradiated with a laser and thus melted and fused together in a molding machine which receives a plurality of slice data.

Figure 12:
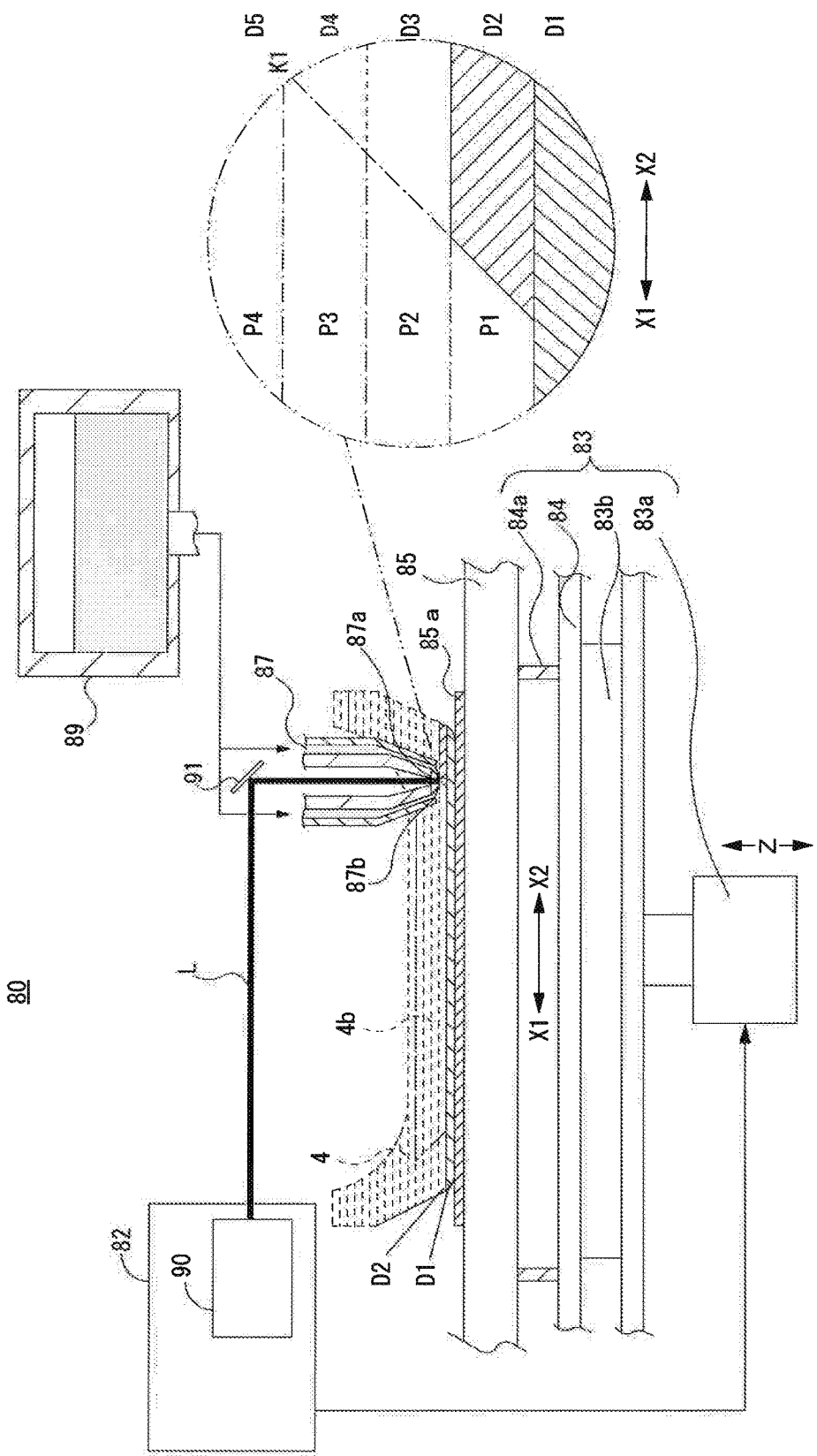
FIG. 12 is a schematic illustration showing an example of an additive fabrication apparatus.

FIG. 12 is a schematic illustration of an additive manufacturing apparatus 80. The additive manufacturing apparatus 80 is comprised of a control unit 82, which receives slice data and controls the related mechanisms based on the slice data, a scanning table 85, which is disposed on a table moving unit 83 and movable in the X-axis, Y-axis, and Z-axis directions, a nozzle mechanism 87, which casts a laser light while spraying a metal powder in the direction of the basis material 85a laid on the scanning table 85, a chamber 89, which supplies the metal powder constantly into the nozzle mechanism 87, and a laser output unit 90, which outputs laser light L to the nozzle mechanism 87. It is to be noted that in the present example, the nozzle mechanism 87 sprays iron powder, which is one example of the metal powder.

The scanning table 85 is disposed on the table moving unit 83. The table moving unit 83 is comprised of a lifting unit 83a, which moves the scanning table 85 up and down in the Z-axis direction, a slider mechanism 83b, which is disposed on a support plate movable in conjunction with the up-and-down motion of the lifting unit 83a, a movable plate 84, which is made slidable in the X-axis (left-right) direction by the slider mechanism 83b, and a slider mechanism 84a, which is disposed on the movable plate 84.

The slider mechanism 84a supports the scanning table 85 slidably in the Y-axis (front-back) direction perpendicular to the X-axis direction. The lifting unit 83a and the slider mechanisms 83b, 84a are provided with their respective drive sources, such as motors, that operate according to the drive signals outputted from the control unit 82. With these drive sources repeatedly controlled according to the slice data, the corresponding layers are stacked (laminated) successively into a shape represented by the slice data. It should be noted that in this example, the lamination direction is set to the direction from the radially outer side toward inner side of the base mold 20. Accordingly, once a layer corresponding to the first slice data is formed by the repeated scanning in the X-axis and Y-axis directions by the scanning table 85, the scanning table 85 lowers in the Z-axis direction. Then the layer corresponding to the slice data on the layer directly above is formed again by the repeated scanning in the X-axis and Y-axis directions by the scanning table 85. It is to be noted that in the present example, the additive manufacturing apparatus 80 moves the scanning table 85 in the X-axis, Y-axis, and Z-axis directions in relation to the interior of the nozzle mechanism 87. However, the arrangement may also be such that the nozzle mechanism 87 moves in relation to the scanning table 85 or that both of these units move, respectively. Also, the lamination direction may be the axial direction or the circumferential direction of the base mold 20.

The nozzle mechanism 87, which is a cylindrical member extending in the Z-axis direction, has an irradiation port 87a from which laser light L is cast toward the basis material 85a. The laser light L cast from the irradiation port 87a is generated by the laser output unit 90 located inside the control unit 82. The control unit 82 controls the laser output unit 90 based on the respective slice data, thereby controlling the execution of output, output timing, output duration, etc., of laser light L from the laser output unit 90. The light path of laser light L outputted from the laser output unit 90 is adjusted by a light path adjusting mirror 91. The laser light L reflected by the light path adjusting mirror 91 is cast to the basis material 85a after being passed through substantially the center of the irradiation port 87a disposed at the tip of the nozzle mechanism 87.

Disposed around the irradiation port 87a of the nozzle mechanism 87 is a spray nozzle 87b for spraying iron powder contained in the chamber 89 toward the basis material 85a. The iron powder to be sprayed from the spray nozzle 87b is constantly supplied from the chamber 89 which communicates with the spray nozzle 87b by way of a not-shown supply tube. The iron powder reaching the spray nozzle 87b is sprayed toward the basis material 85a to converge on the laser light L together with the shield gas jetted from a not-shown gas nozzle disposed immediately before the spray nozzle 87*b*. It is to be noted that the jetting of the shield gas is also controlled by the control unit 82.

The iron powder sprayed toward the basis material 85*a* is melted and fused together by the high-output laser light L irradiated from the irradiation port 87*a*. Thus, the shape represented by the slice data is formed with the scanning table 85 performing scanning in the X-axis and Y-axis directions according to the slice data while the irradiation of laser light L and the spray of iron powder are done at the same time by the nozzle mechanism 87.

Next, a description is given of an example of forming a hollow cavity 50 inside the base mold 20 by the additive manufacturing apparatus 80. The enlarged view in FIG. 12 is an illustration showing a state in which the forming of a second layer to be stacked on the first layer is progressing based on slice data D2 after the end of forming the first layer based on slice data D1 for the lowermost layer. As illustrated, the slice data D2 for the second layer contains a region P1 corresponding to a part of the shape of the heating chamber 4*b* extending in the axial direction of the base mold 20. Similarly, the slice data D3, D4, and D5 for the upper layers contain regions P2 to P4, respectively, corresponding to the parts of the shape of the heating chamber 4*b*.

From the position indicated in the illustration, the control unit 82 causes the scanning table 85 to scan in the direction of X1 to X2. And when the tip (laser light L) of the nozzle mechanism 87 reaches one end K1 of the width direction of the region P1, the control unit 82 causes the scanning table 85 to temporarily stop scanning in the X2 direction. After the stop of scanning, the control unit 82 resumes causing the scanning by the scanning table 85. Also, at this time, the control unit 82 controls the laser output unit 90 to stop the output of laser light L therefrom and forms a hollow cavity corresponding to a heating chamber 4*b*.

The state of the output of laser light L being stopped continues until the tip of the nozzle mechanism 87 reaches the other end in the width direction on the opposite side of one end K1 in the width direction, with the scanning table 85 scanning in the X2 direction. With the tip of the nozzle mechanism 87 reaching the other end in the width direction, the control unit 82 resumes the output of laser light L and the scanning of the scanning table 85 in the X2 direction. After the resumption of scanning, the control unit 82 continues the scanning until the tip of the nozzle mechanism 87 reaches the other end in the width direction of the region P1. With the tip of the nozzle mechanism 87 reaching the other end in the width direction of the region P1, the control unit 82 again causes the scanning table 85 to stop scanning in the X2 direction. After the stop of scanning, the control unit 82 causes the spray of the iron powder onto the first layer and at the same time resumes causing the irradiation of laser light L. With the resumption of the spray of iron powder and the irradiation of laser light L, the forming of parts other than the region P1 corresponding to the heating chamber 4*b* is resumed. Then the above-described control is repeated for slice data D3, D4, D5, . . . for the upper layers. Eventually, heating chambers 4*b* each having a shape represented by the three-dimensional CAD data are formed within the base mold 20.

Although a description of a specific manufacturing process of the pattern mold 30 is omitted, it is to be appreciated that in the same way as with the base mold 20, the pattern mold 30 that can be fitted to the base mold 20 can be manufactured by controlling the scanning table 85 and the nozzle mechanism 87 based on the slice data of the master data corresponding to the pattern mold 30. Moreover, it is possible to easily manufacture the pattern mold 30 which has the predetermined recesses and projections for molding a tread pattern. Also, the same process of manufacturing the sector mold 4 as described above may be applied to the manufacturing of the side molds 2, 3.

Also, when the tip of the nozzle mechanism 87 has reached the regions corresponding to the parts of the heating medium supply channel 55*a* and the heating medium discharge channel 55*b*, the irradiation of laser light L may be controlled to form the heating medium supply channel 55*a* and the heating medium discharge channel 55*b* inside the base mold 20 which can communicate the heating chambers 4*b* with the exterior of the base mold 20.

Also, the material forming the side molds 2, 3 and the sector mold 4 is not limited to metal powder as described above. It may be a resin powder, such as synthetic resin, ceramics or ceramics powder, which is a sintered compact of inorganic substance, or a composite material powder mixing two or more of resin powder, ceramics powder, and metal powder.

Also, in the foregoing embodiment, the mold, which is a three-dimensional object, is formed by sintering by irradiating metal powder with laser light L. And the laser light L may be not only ordinary laser light L, but also other types of laser light including LED light of a laser light semiconductor. The laser light may be changed as appropriate according to the properties of the material to be sintered.

Heretofore, the present invention has been described with reference to a plurality of embodiments. However, the invention is not limited to those embodiments as described. It is evident to those skilled in the art that various combinations of the features of the embodiments can also be made without departing from the spirit of the invention.

One embodiment of the present invention is a tire mold for curing a tire by transferring heat to the tire, which includes a hollow cavity formed inside the tire mold and a heating medium held inside the hollow cavity and heating the tire via the tire mold.

According to this embodiment, a tire mold has a hollow cavity therein, and a heating medium held inside the hollow cavity heats an uncured tire. Therefore, the distance between the heating medium and the tire is close. As a result, there will be less energy loss resulting from curing, which improves the curing efficiency. Also, the heating medium to be used is an optional material different from that of the tire mold. Also, a plurality of hollow cavities may be provided independently of each other. Here, the state of a plurality of hollow cavities provided independently of each other means a state in which there is no communication between the plurality of hollow cavities themselves.

In another implementation of the invention, the tire mold may have a heating medium supply/discharge channel communicating with the hollow cavity and the exterior thereof. Also, the arrangement may be such that the hollow cavity extends from one end to the other end of the tire mold in the circumferential, axial, or radial direction, and the heating medium supply/discharge channels are provided at one end and the other end thereof.

According to this implementation, the heating medium can be circulated through the heating medium supply/discharge channels communicating with the hollow cavity and the exterior, and the temperature within the hollow cavity can be controlled. Also, the heating medium to be held in the hollow cavity can be supplied and discharged freely, and it is possible to reuse the heating medium.

In still another implementation of the invention, the tire mold may be such that the hollow cavity is a flow channel for circulating the heating medium from a heating medium supply side to a heating medium discharge side.

According to this implementation, the heating medium in the hollow cavity can be circulated. As a result, the temperature of the tire mold can be brought closer to the set temperature, thus improving the curing efficiency. Also, the arrangement may be such that the heating medium is not circulated.

In still another implementation of the invention, the tire mold may be such that the hollow cavities are formed along the radial direction or the axial direction of the tire mold and the distance between the hollow cavities and the surface of the tire mold varies with the hollow cavities. Here, the distance between the hollow cavities and the surface of the tire mold means the closest distance (interval) between the position of the hollow cavity radially closest to the surface of the tire mold and the surface of the tire mold.

In still another implementation of the invention, the tire mold may be such that a plurality of hollow cavities are formed along the radial direction or the axial direction of the tire mold and the location density varies between the hollow cavities. Also, the arrangement may be such that, of the heating medium circulating through a plurality of hollow cavities, the heating medium inside a hollow cavity has a different temperature from the temperature of the heating medium inside the other cavities. Also, the arrangement may be such that the temperatures of the heating medium circulating through the plurality of hollow cavities are different in three positions or more. Also, the arrangement may be such that hollow cavities to hold a cooling medium for cooling the tire are formed in the tire mold.

According to these implementations, in addition to the effects resulting from the above-described arrangements, the heat transference can be controlled. As a result, correct quantities of heat can be given to the different regions of the tire. And this allows the tire to be cured at optional degrees of curing.

In still another implementation of the invention, the tire mold may be comprised of a base mold and a pattern mold fitted to the base mold, and the pattern mold has a surface portion for molding the surface of a tire.

In still another implementation of the invention, the tire mold may be such that the hollow cavity is formed in a position radially outer side of the tire mold than the surface portion of the pattern mold. Also, the arrangement may be such that the hollow cavity is formed in a position between the base mold and the pattern mold or within the base mold.

According to these implementations, the uncured tire can be cured correctly. Thus there will be less energy loss due to heat dissipation, which improves the curing efficiency.

Another embodiment of the present invention is a method for manufacturing a tire mold by curing the tire by transferring heat to the tire. The method includes a step of forming a hollow cavity inside a tire mold and a step of forming a heating medium supply/discharge channel communicating with the hollow cavity and the exterior of the tire mold.

In another embodiment of the invention, the method for manufacturing a tire mold by curing the tire which includes a base mold and a pattern mold fitted to the base mold and having a surface portion for molding the surface of a tire. The method includes a step of forming a hollow cavity inside the base mold and the pattern mold or inside one of them and a step of forming heating medium supply/discharge channels communicating with the hollow cavities and the exterior of the base mold and the pattern mold or one of them.

According to this embodiment, a tire mold can be obtained which can supply a heating medium to the hollow cavities via heat adjusting agent supply/discharge channels.

In still another embodiment of the invention, a method for manufacturing a tire mold includes melting and fusing metal powder according to a plurality of slice data, which are master data of abase mold and a pattern mold sliced, and laminating a plurality of metal layers according to the shape represented by the respective slice data, thus molding the base mold and the pattern mold into the shapes represented by the respective master data. In this method, part of the plurality of slice data of the master data of the base mold and the pattern mold contain regions corresponding to the part of the hollow cavity, and the melting and fusion of the metal powder are stopped within the regions so as to form the hollow cavity communicating with the heating medium supply/discharge channels.

According to this embodiment, part of a plurality of slice data of the master data of the base mold contains regions corresponding to the part of the hollow cavity to be provided inside the base mold, and the melting and fusion of the powder material are stopped within the regions so as to form the hollow cavity communicating with the heating medium supply/discharge channel. Hence, a tire mold can be obtained which has hollow cavities capable of circulating the heating medium therewithin.

The present invention described thus far does not recite all the necessary features. It is to be understood that various arrangements constituting the subcombinations of the features are also part of the invention.

DESCRIPTION OF REFERENCE NUMERALS 1 curing apparatus
2 side mold
2b heating chamber
3 side mold
3b heating chamber
4 sector mold
4b heating chamber
4d heating chamber
20 base mold
30 pattern mold
55a heating medium supply channel
55b heating medium discharge channel
80 additive manufacturing apparatus
85 scanning table
87 nozzle mechanism

The invention claimed is:

1. A tire mold for curing a tire by transferring heat to the tire, comprising:
   a plurality of hollow cavities formed inside the tire mold; and
   a heating medium held inside the plurality of hollow cavities and being for heating the tire via the tire mold,
   wherein:
   the plurality of hollow cavities are formed independently of each other, and
   a first distance from a surface of the tire mold of one of the hollow cavities formed in a center molding range having a thinnest gauge thickness of the tire is largest, a second distance from the surface of the tire mold of ones of the hollow cavities formed in shoulder molding ranges having a thickest gauge thickness of the tire is least, and a third distance of ones of the hollow cavities formed in buttress molding ranges having a gauge thickness greater than the center molding range and less than the shoulder molding ranges is less than the first distance and greater than the second distance.

2. The tire mold of claim 1, wherein the heating medium is of a material different from the material of the tire mold.

3. The tire mold of claim 1, further comprising heating medium supply and discharge channels communicating with the plurality of hollow cavities and outside of the tire mold.

4. The tire mold of claim 3, wherein the plurality of hollow cavities each extend from one end to the other end of the tire mold in a circumferential, axial, or radial direction and the heating medium supply and discharge channels are provided at the one end and the other end, respectively.

5. The tire mold of claim 1, wherein the plurality of hollow cavities are flow passages for circulating the heating medium from a heating medium supply side to a heating medium discharge side.

6. The tire mold of claim 3, wherein the plurality of hollow cavities are formed along a radial direction or an axial direction of the tire mold and location density between the hollow cavities varies among the center, shoulder, and buttress molding ranges.

7. The tire mold of claim 1, wherein, of the heating medium in the plurality of hollow cavities, the heating medium inside one hollow cavity has a temperature different from a temperature of the heating medium inside the hollow cavities other than the one hollow cavity.

8. The tire mold of claim 1, wherein temperatures of the heating medium in the plurality of hollow cavities are different in three positions or more.

9. The tire mold of claim 1, further comprising a hollow cavity to hold a cooling medium for cooling the tire.

10. The tire mold of claim 1, further comprising a base mold and a pattern mold fitted to the base mold, the pattern mold having a surface portion for molding a surface of the tire.

11. The tire mold of claim 10, wherein the plurality of hollow cavities are formed in a position radially outward of the tire mold than the surface portion of the pattern mold.

12. The tire mold of claim 10, wherein the plurality of hollow cavities are formed in a position between the base mold and the pattern mold or within the base mold.

13. The tire mold of claim 1, wherein each of the plurality of hollow cavities corresponds to one of the center molding range, a first range of the shoulder molding ranges, a second range of the shoulder molding ranges, a first range of the buttress molding ranges, and a second range of the buttress molding ranges.

14. The tire mold of claim 1, wherein three of the plurality of hollow cavities are formed in the center molding range and one of the hollow cavities is formed in each of a first range of the shoulder molding ranges, a second range of the shoulder molding ranges, a first range of the buttress molding ranges, and a second range of the buttress molding ranges.

* * * * *